US006535523B1

(12) United States Patent
Karmi et al.

(10) Patent No.: US 6,535,523 B1
(45) Date of Patent: Mar. 18, 2003

(54) SYSTEM AND METHOD FOR PERSISTENCE VECTOR BASED RATE ASSIGNMENT

(75) Inventors: Gadi Karmi, San Diego, CA (US); Matthew Stuart Grob, La Jolla, CA (US); Paul E. Bender, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/410,199

(22) Filed: Sep. 30, 1999

(51) Int. Cl.[7] ................................................. H04J 3/16
(52) U.S. Cl. ...................................... 370/468; 370/342
(58) Field of Search ................................ 370/465, 466, 370/468, 480, 230, 232, 337, 345, 346, 347, 442, 443, 444, 455, 461, 462, 441, 342, 320, 335, 341; 340/825.5; 455/450, 452, 509, 512, 513

(56) References Cited

U.S. PATENT DOCUMENTS

| | | | |
|---|---|---|---|
| 5,488,609 A | 1/1996 | Hluchyj et al. | 37/84 |
| 5,619,492 A | 4/1997 | Press et al. | 370/441 |
| 5,729,542 A | * 3/1998 | Dupont | 370/455 |
| 5,857,147 A | 1/1999 | Gardner et al. | 455/67.1 |

OTHER PUBLICATIONS

*Computer Networks*, Tanenbaum, 3rd Edition, Prentice Hall, 1996, pp. 250–251, 256, 258.
Chung, et al "Power Allocation for Multi–Rate Multiuser Detection in Wideband CDMA Systems" IEEE Conf. 50: 608–612 (Sep. 1999).
Guo, Yile "Capacity of Multi–class Traffic CDMA System with Multiuser Receiver" IEEE Wireless Communications & Networking Conference 1:500–504 (Sep. 1999).
Lal, et al. "Distributed Resource Allocation for DS–CDMA– Based Multimedia ad hoc Wireless Lan's" IEEE J. on Selected Areas in Communications 17(5): 947–967 (May 1999).
Oh, et al. "Adaptive Resource Allocation in Power Constrained CDMA Mobile Networks" IEEE Wireless Communications & Networking Conference 1:510–514 (Sep. 1999).

* cited by examiner

*Primary Examiner*—Dang Ton
(74) *Attorney, Agent, or Firm*—Philip R. Wadsworth; Kent D. Baker; Sean English

(57) ABSTRACT

In a system including a resource which is shared among a number of users, it is difficult to distribute the available capacity of the resources fairly among the users and still maximize resource utilization. Additionally, it is desirable to allow at least some of the control over usage rates to remain with the users, while at the same time avoiding situations where the resource is overloaded. A system and method are disclosed wherein usage rates are selected from among a set of available rates according to a set of persistence vectors.

32 Claims, 9 Drawing Sheets

SYSTEM AND METHOD FOR PERSISTENCE VECTOR BASED RATE ASSIGNMENT

BACKGROUND OF THE INVENTION

1. Field of the Invention

This invention relates to allocation of a limited resource among multiple users. More specifically, this invention relates to the assignment of usage rates based on a set of persistence vectors.

2. Description of Related Art and General Background

A shared resource is one which may be used by multiple users. Shared resources which have limited availabilities or capacities include such diverse examples as electric power stations and other energy plants, water sources such as reservoirs and flowing bodies, supply systems for the distribution of goods and/or materials, and data communications networks and pathways. Problems associated with allocating the use of a shared resource among multiple users may therefore arise in many different contexts. Regardless of the particular context, however, such resources may be found in many systems in which at least the following conditions hold:

the capacity or availability of the shared resource may be expressed in terms of a finite rate R of units per measure of time (e.g. kilowatts/hour, gallons/minute, cartons/week, or bits/second);

at any particular time, the resource is being used by n different users, where n is a non-negative integer; and at any particular time, the usage of the i-th user (where $1 \leq i \leq n$) may be characterized by a finite usage rate $u_i$ of units per measure of time.

A basic model for such a system is shown in FIG. 1, where resource 100 is used by users 120a–d at rates 110a–d, respectively. Depending on the particular implementation, the rate R which characterizes the shared resource may indicate an actual or estimated limit of the capacity of the resource (e.g. in the case of a communications pathway) or, in the alternative, the rate R may be a threshold indicating a maximum safe or permissible load of the resource (e.g. in the case of a power generation facility or device). Likewise, the usage rates $u_i$ may indicate actual use, expected use, or requests or demands for use.

An overload condition arises when the sum of the n usage rates $u_i$ at any one time exceeds the value R. With respect to a power plant, for example, an overload condition may arise when the total current draw exceeds the rated capacity. With respect to a data communications pathway, an overload condition may arise when the total data transfer rate exceeds the pathway's actual capacity, thereby corrupting the data in transmission. In certain situations such as water supply or warehousing of materials, an overload condition may also indicate that although user demands are currently being met, reserve or buffer capacity is being depleted.

Depending on the nature of the resource, the consequences of an overload condition will vary, possibly including the need for an offline period for resource recovery (e.g. cooling of a power generation system or replenishment of a reservoir) or the need to expend present capacity in order to repeat a use that was attempted in the past but failed because of the overload (e.g. retransmission of a data packet corrupted by a collision). The resource may even become temporarily or permanently unable to regain its former capacity. In cases where the sum of the n usage rates $u_i$ may exceed the value R, it is desirable to control the usage rates in some fashion so as to avoid overload conditions.

SUMMARY OF THE INVENTION

In a system or method according to an embodiment of the invention, a resource is shared among a set of users. Each user has a usage rate selected from a set of available rates, and each user's use of the resource is determined at least in part by the user's usage rate. Each user also has a set of persistence vectors, each vector element corresponding to a rate among the set of available rates. Selection of a user's usage rate from the set of available rates is based at least in part on one among the set of persistence vectors.

DETAILED DESCRIPTION OF THE INVENTION

One way to avoid overload conditions while maximizing resource use is to divide the estimated capacity of the resource into a number of fixed rate allocations, assigning these allocations as the n usage rates ui. In a system where users have changing usage requirements, however, this approach may lead to suboptimal utilization of the shared resource.

Figure 1:
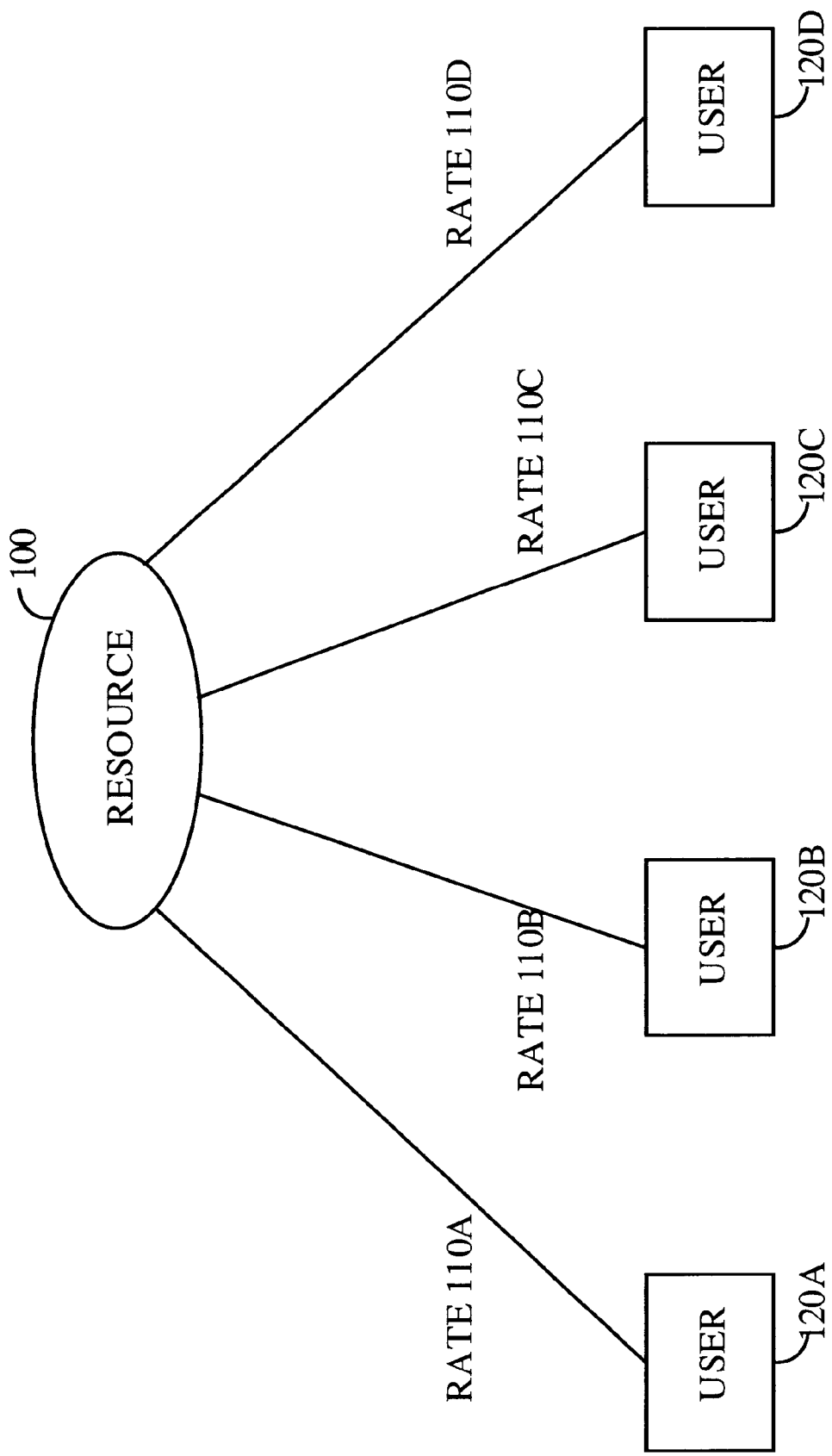
FIG. 1 is an illustration of a system including a resource shared among several users.

For example, assume in FIG. 1 that resource 100 is a water supply having a capacity of 1200 gallons/minute, and that a permitted usage rate from among a predetermined set of available rates is assigned to each user (where the set of available rates is represented as an m-element vector $Y=\{Y_0, Y_1, \ldots, Y_{m-1}\}$). In this example, users 120a–d may each use the resource at a rate of $Y_0=300$, $Y_1=600$, $Y_2=900$, or $Y_3=1200$ gallons/minute (i.e. m=4). If a fair distribution is implemented wherein all of the users are assigned the same fixed rate, then each of the four users 120a–d may be permitted to use the resource at rate $Y_0$ (300 gallons/minute). Such an assignment effectively avoids overloading the resource. However, if fewer than all of the users 120a–d are likely to be using resource 100 at any given time, this approach is also wasteful of resource capacity.

Now consider the case where resource 100 has the same capacity of 1200 gallons/minute and the set of available rates is as above, but where the probability that each user will be using resource 100 at any given time is only ¼ (we assume that each user's use is uncorrelated with that of each of the other users). In this situation, a more optimal utilization of resource 100 might be obtained by permitting each user to use the resource at rate $Y_3$ (1200 gallons/minute), as only one of the four users is likely to be using the resource at any given time. Of course, use by more than one user at a time may now result in an overload condition.

In a related example, the probability that any of the four users 120a–d will be using resource 100 is ½. In a first scheme under this example, each user may be permitted to use the resource at rate $Y_1$ (600 gallons/minute). Alternatively, in a second scheme, each user may be permitted to use the resource at a rate of either $Y_0$ or $Y_2$ (300 or 900 gallons/minute, respectively) where the probability of being permitted to use each rate is ½. At any given moment, either such scheme would be expected to maximize resource utilization without resulting in an overload condition. Under the first scheme, however, an overload condition may occur if three users should happen to use the resource at the same time (as the total permitted usage would be 1800 gallons/minute). In a system using the second scheme, it is possible (though unlikely) for three users to use the resource without creating the potential for an overload condition (as the total permitted usage could be as low as 900 gallons/minute).

In a further alternative of this example, the set of available rates is altered or expanded such that each user is permitted to use the resource at a rate of either 200 or 800 gallons/minute, where the probability of using each rate is again ½. At any given moment, the sum of the permitted usage rates of the users 120a–d would be expected to be 1000 gallons/minute (i.e. two users, one having a permitted usage rate of 200 gallons/minute, and the other having a permitted usage rate of 800 gallons/minute), leaving 200 gallons/minute of the capacity of resource 100 unused. Under this scheme, even if three users happen to use the resource at one time, the potential for an overload condition would be expected to arise in only half of such cases (i.e. it is equally likely for the total permitted usage to be 600 or 2400 gallons/minute, and it is also equally likely for the total permitted usage to be 1200 or 1800 gallons/minute).

In an extension of such a scheme to a given application, system values such as the number of users of a resource, the probability of use by each user, and the usage requirements of each user may be either observed or estimated. These values may then be combined with design parameters such as a number of available usage rates for each user, an acceptable rate of occurrence of overload conditions, and a minimum acceptable average rate of resource utilization to obtain a probabilistic model for system control whereby resource utilization is maximized, and the occurrence of overload conditions is minimized or eliminated.

Figure 1A:
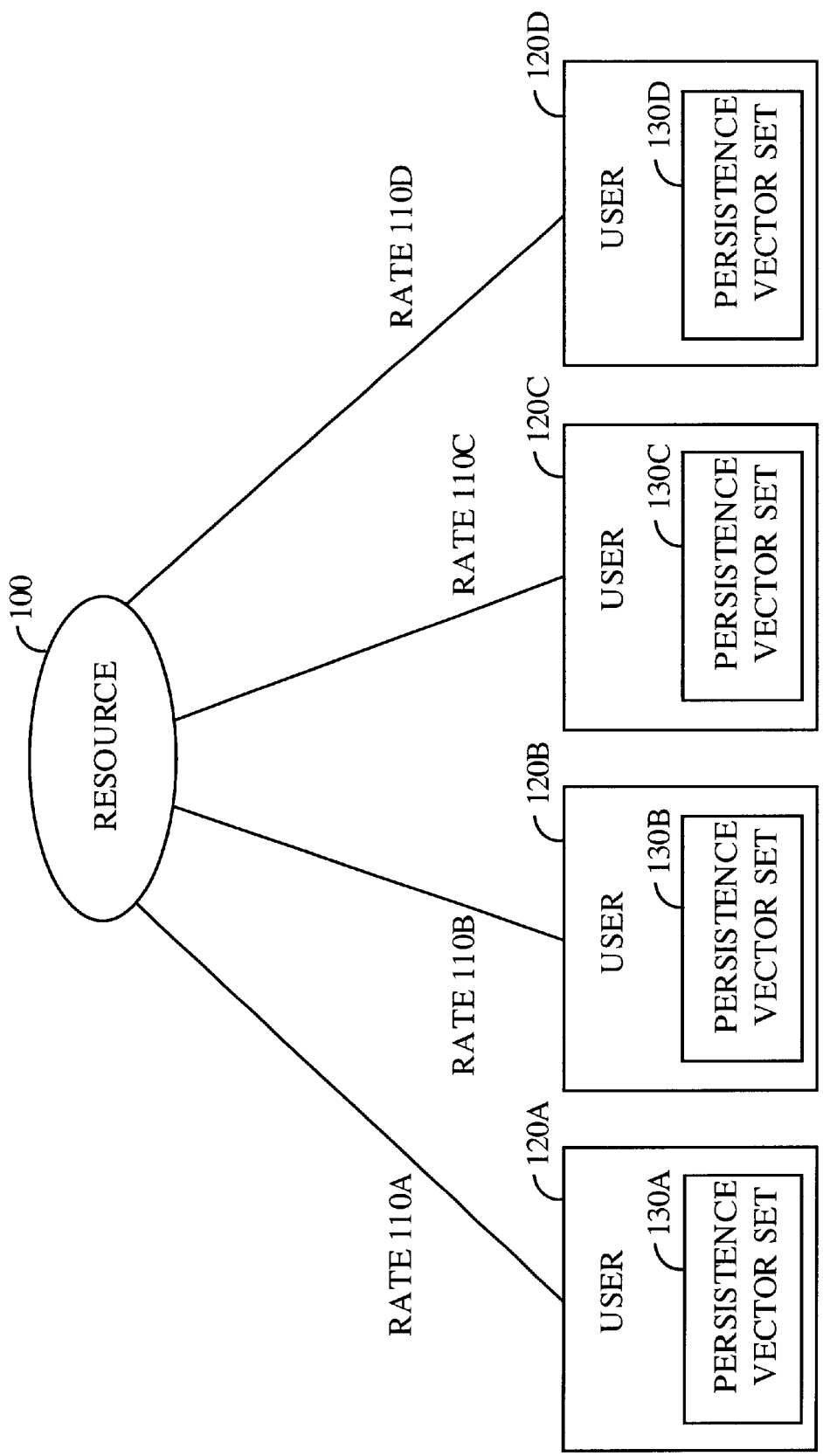
FIG. 1A is an illustration of a system according to a first embodiment of the invention.

In a system according to a first embodiment of the invention, as shown in FIG. 1A, each user 120i has a set of persistence vectors 130i and a permitted usage rate 110i taken from a set of available rates. (Note that it is possible for the system to include other users who lack a set of persistence vectors.) The length of each vector in set 130i may be any integer greater than zero, and each vector element represents a probability of using a particular usage rate or of changing from one usage rate to another. In this embodiment, each vector in set 130i corresponds to at least one member of the set of available rates, although in other embodiments the vectors may correspond to members of a different set instead (e.g. a set of predetermined usage profiles). Set 130i may be unique to each user, or the same set may be assigned to all users in a particular class, or the same set may be assigned to all of the users in the system. Likewise, set 130i may be a permanent aspect of the operation of the user, or it may be updated periodically or otherwise. Other relevant aspects of persistence vector structure, distribution, and use are discussed in the co-pending Application No. Ser. 09/410,204, entitled "SYSTEM AND METHOD FOR PERSISTENCE-VECTOR-BASED MODIFICATION OF USAGE RATES," filed concurrently herewith, assigned to the assignee of the present invention, and the disclosure of which application is hereby incorporated by reference.

In an Example 1, applied to one of the situations above, each user has the same set of persistence vectors, which set comprises a vector $P=\{P_1, P_2, P_3\}$ and wherein the elements $P_1$, $P_2$, and $P_3$ correspond to the rates $Y_1$ (600 gallons/minute), $Y_2$ (900 gallons/minute), and $Y_3$ (1200 gallons/minute), respectively. Each element of P indicates a probability that the corresponding rate will be used, and any remaining probability indicates a probability that the lowest rate $Y_0$ (300 gallons/minute) will be used. The values of the elements of P may be chosen, for example, to maximize the average collective use of the resource without creating an unsuitably high risk of occurrence of an overload condition.

In this example, the element $P_2$ is set to indicate a probability of ½, and the other two elements of P are each set to indicate a probability of zero. Before each use (i.e. for uses that are discontinuous and discrete) and/or periodically during use (i.e. for uses that are continuing over time), each user chooses a permitted usage rate based on the probabilities indicated by the elements of P. For the values of P indicated in this case, the user will choose rate $Y_2$ (900 gallons/minute) 50% of the time and rate $Y_0$ (300 gallons/minute) the remainder of the time. Because the probability that each user will use the resource at any given time is determined to be ¼ for this example, on average it may be expected that the full 1200-gallons/minute capacity of the resource will be utilized and that overload conditions will be avoided. Additionally, the distribution among users is fair in this example because on average all of the permitted usage rates will be equal.

In an Example 2, resource 100 is the reverse link of a CDMA telecommunications system. In this case, each user 120 may comprise: 1) a transmitter, such as a mobile telephone or a WLL (wireless local loop) station, connected to 2) a data-producing device, such as a laptop computer or a point-of-sale terminal, through a PCMCIA card or a similar interface, and outputting data encapsulated in packets over IP or any other suitable protocol. Several generations and versions of CDMA telecommunications systems have already been implemented. While most of these CDMA systems have been designed to carry digitized voice communications, however, the system and method herein described are especially well-suited to a network serving users with widely varying transmission rates, such as a data-only network or a mixed voice-data network.

In one particular implementation of Example 2, each user has the same fixed set of available rates, wherein each rate is expressed in kilobits per second (Kb/s) and the set of rates is designed to increment in powers of two. Because a doubling in rate requires a doubling in power to maintain the same ratio of energy per bit to noise power spectral density ($E_b/N_0$), each rate step thus corresponds to a power step of 3 dB. The available rate values in this example include 4.8, 9.6, 19.2, 38.4, 76.8, 153.6, and 307.2 kilobits/second (Kb/s).

Although the elements in the set of available rates in Example 1 are related to each other in a linear fashion, and the elements of the set in Example 2 are related in an exponential fashion, no such relation or progression is necessary in a system or method according to an embodiment of the invention. Likewise, it is not necessary for each user to have the same predetermined set of available rates.

Note that selection of a rate based upon the persistence vector set may indicate permission rather than a requirement to use that rate. The actual rate used may depend upon other factors as well, such as a user's current need and/or ability to use the resource. Likewise, the actual usage rate may or may not be a member of the set of available rates that is used to indicate permission.

If use of the resource is discontinuous (e.g. packet data transmission over a common channel), the set of persistence vectors may be referenced before each use. If resource use is continuous (e.g. transfer of electrical power) or prolonged, then the set of persistence vectors may be referenced and the permitted usage rate adjusted as necessary at predetermined intervals during use or upon the occurrence of some predetermined event or events.

In a more general implementation, each persistence vector in set 130$i$ corresponds to a member of the set of available rates. Note that the set 130$i$ may also be considered as a transition probability matrix wherein, for example, each column comprises one of the persistence vectors and each row corresponds to one among the set of available rates. The particular persistence vector to be referenced at any point may depend, for example, upon the current or most recent actual or permitted usage rate, such that a user's future use may be constrained to some degree by its past usage history.

In a system or method according to the first embodiment, it is also possible for a user to have more than one persistence vector corresponding to each member of the set of available rates, each vector describing a different behavior. For example, one persistence vector may tend to indicate a higher average rate, or a more even distribution of probabilities among the various available rates, than another. In such a situation, the user may choose between its available persistence vectors according to such criteria as:

time (e.g. time of day, time of year, etc.) as an indicator of such factors as expected system load or behavior or resource capacity;

anticipated need by the user;

quality of service in recent use: for example, how well-conditioned is the supply of electrical power, or how free of impurities is the supply of water. A reduction in the quality of service may cause a user to change its persistence vector in order to relieve system load;

reduction of service in recent use: in a system that may withstand overload conditions without incurring lasting damage, for example, a user may conclude that an overload has occurred when a usage rate is not met or a level of service is otherwise reduced. Such reduction or denial of service may also cause a user to adopt a different persistence vector in an attempt to repair the overload condition.

Figure 2:
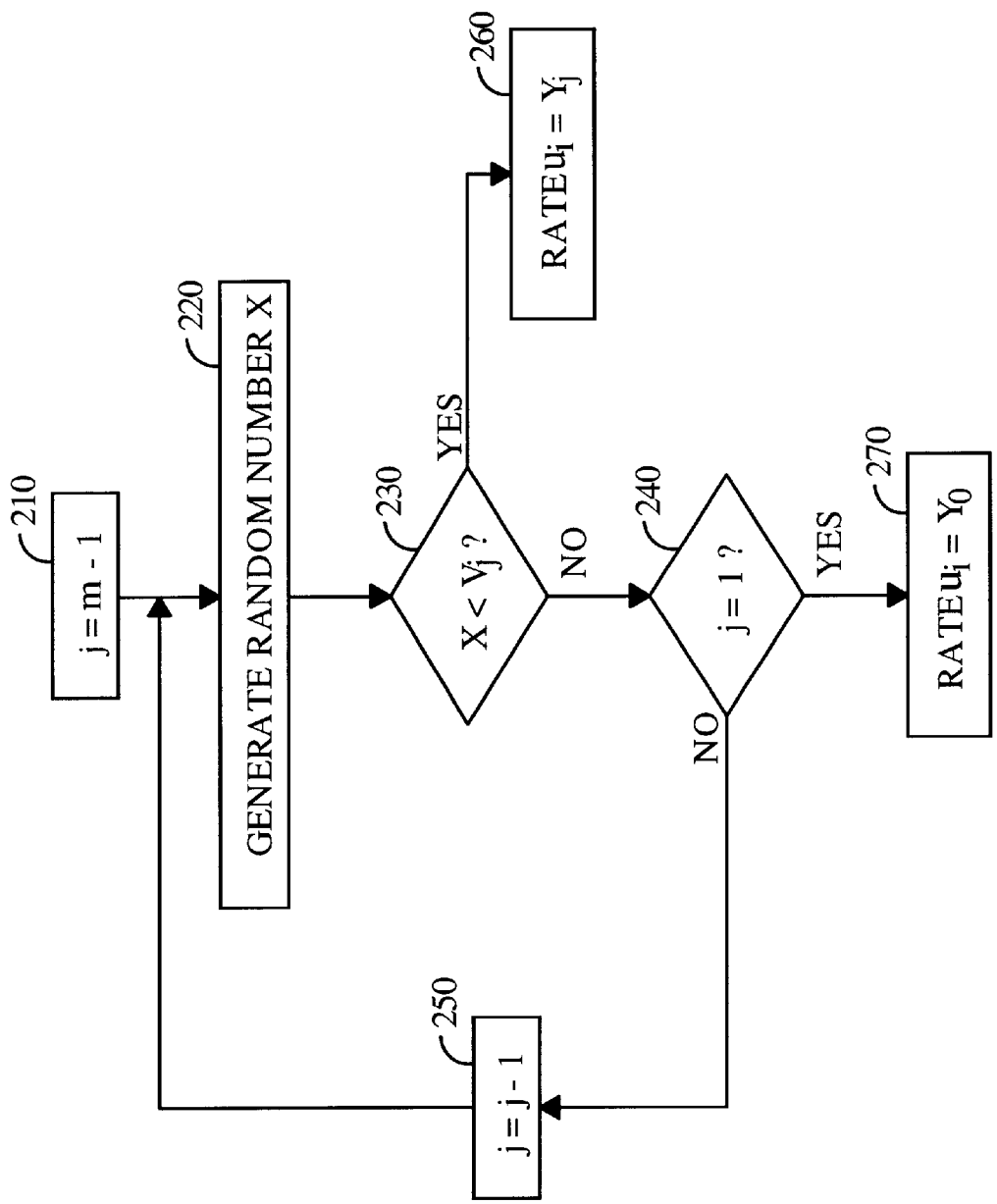
FIG. 2 shows a flowchart of a method according to a second embodiment of the invention.

FIG. 2 illustrates a method according to a second embodiment of the invention. In this method, a user has a set of persistence vectors including an (m−1)-element vector V, wherein V={$V_j$ such that $1 \leq j \leq m-1$}. (As noted above, the vector V may be chosen from among others in a set of persistence vectors according to the most recent usage rate for this user or some other criteria.) Each element $V_j$ of vector V is a persistence value representing a probability which has a value from 0 to 1 and which corresponds to the rate $Y_j$ (where a<b implies $Y_a<Y_b$). For example, vector V may (but is not required to) have the form of a probability density function, wherein the sum of its elements (or of the values represented by its elements) is one. In block 210, a counter j is initialized to cause processing to begin at the persistence value $V_{m-1}$, which corresponds to the highest permitted usage rate ($Y_{m-1}$).

In block 220, a random number x is generated. In an exemplary implementation, x represents a value drawn from a set having a uniform distribution over the range 0 to 1. In block 230, the value of x is tested against the persistence value $V_j$. If x is less than $V_j$, then the rate $Y_j$ is selected as the permitted usage rate $u_i$ in block 260. Otherwise, the value of j is decremented by one in block 250, and the persistence test is repeated. If j reaches the value 1 in block 240, then the lowest rate $Y_0$ is chosen by default in block 270. This method may be altered to allow the use of one among many other relations between the values of x and $V_j$ in place of the test condition shown in block 230, depending on the particular characteristics of the values chosen for x and $V_j$.

Figure 2A:
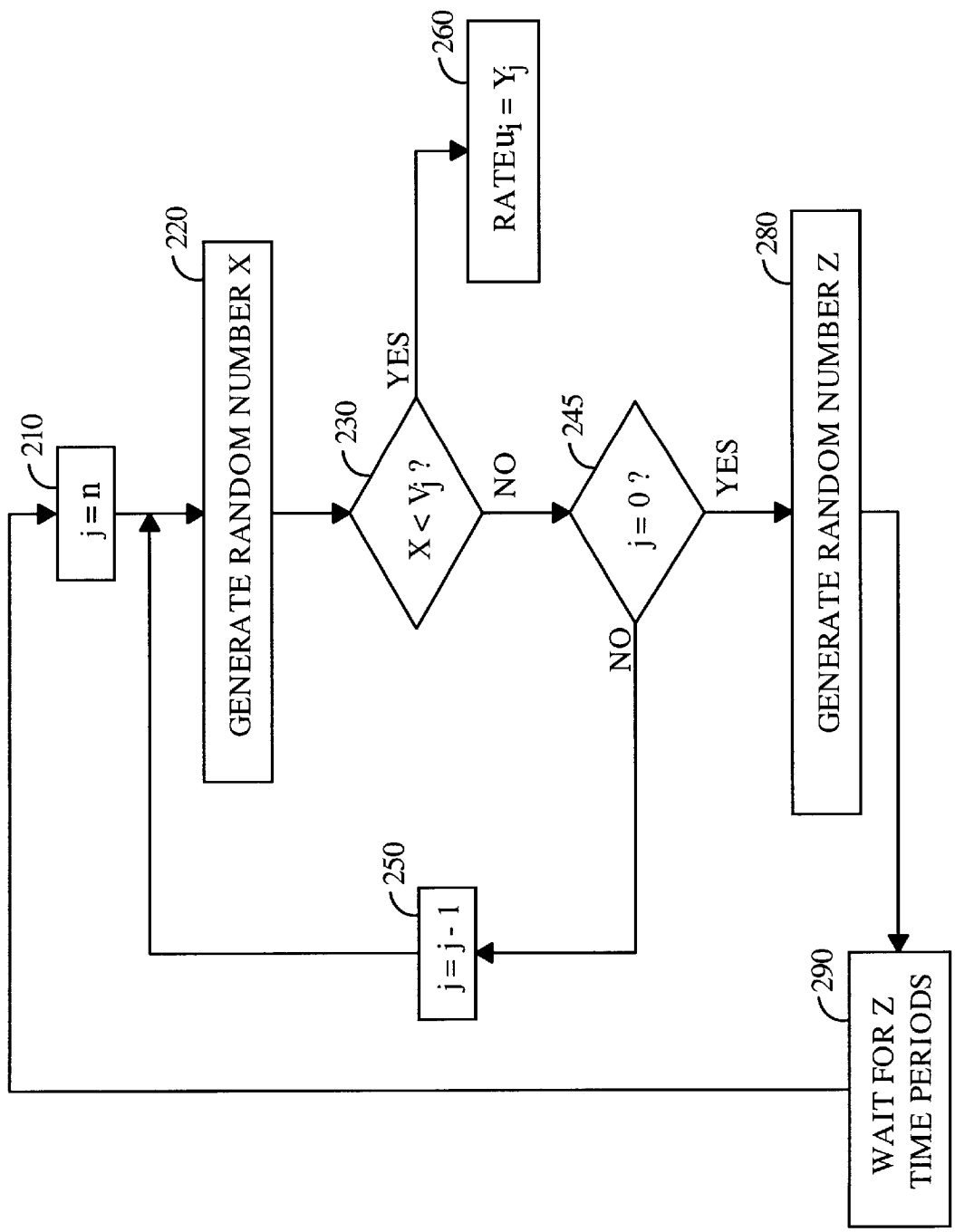
FIG. 2A shows a flowchart of an alternative embodiment of a method according to a second embodiment of the invention.

Note that in the method described above, a user is guaranteed to be permitted to use the resource at no less than the lowest rate. In another implementation of this method, the procedure of assigning a permitted usage rate may be permitted to fail (here, by extending P to include a value $P_0$ corresponding to rate $Y_0$ and allowing the value of j to reach zero in block 245). The user may wait until some external event occurs to repeat the rate assignment procedure, or the user may retry the procedure after some predetermined interval. In an exemplary implementation as shown in FIG. 2A, upon failing to establish a permitted usage rate, the user generates a random number z (in block 280), which represents a value between 1 and a predetermined parameter $N_{backoff}$. In block 290, the user waits for z time periods to pass before retrying the rate selection procedure. In an implementation using the communications network of Example 2, for example, each time period may represent the duration of one time slot or some other unit of time relevant to the operation of the system.

Figure 2B:
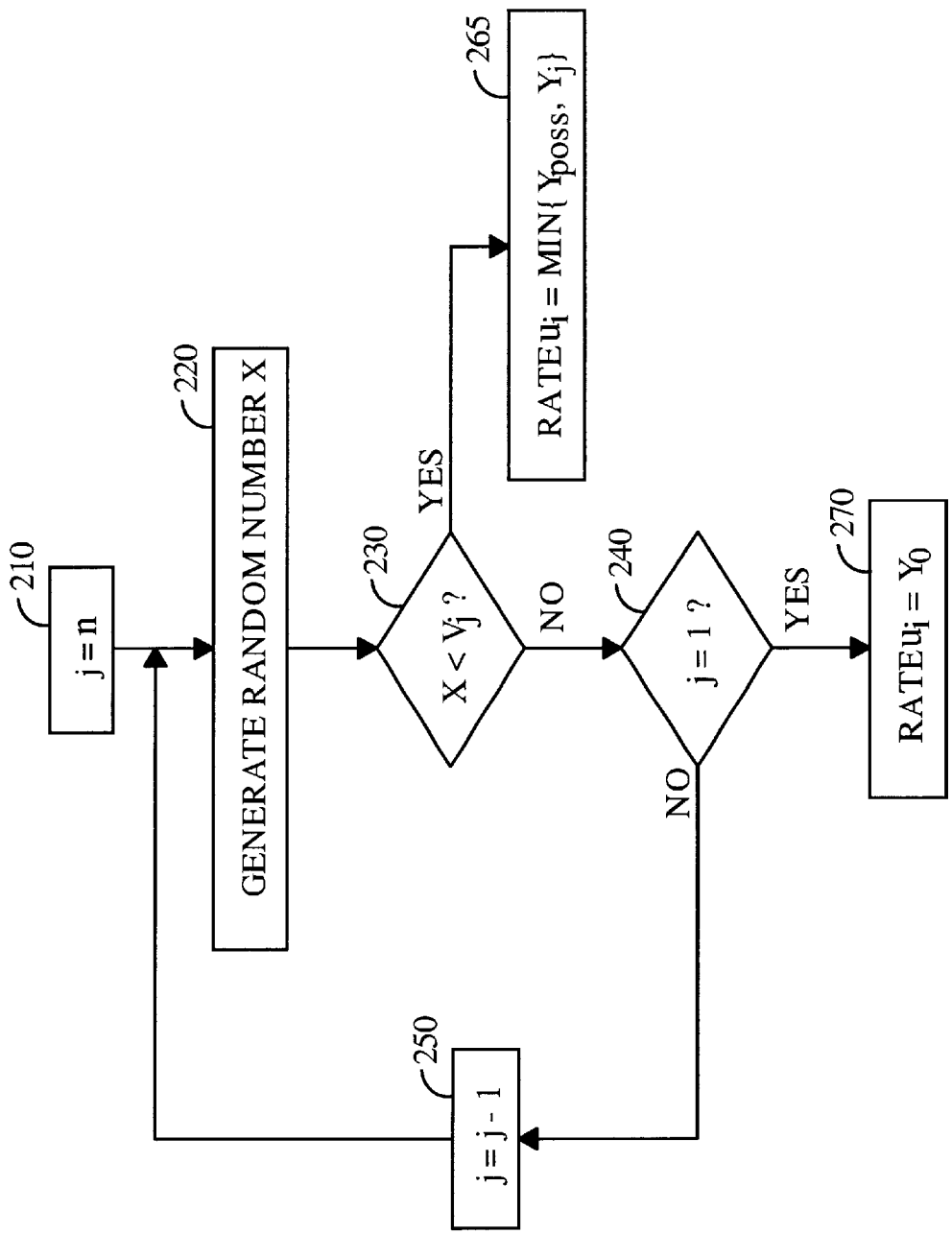
FIG. 2B shows a flowchart of another alternative embodiment of a method according to a second embodiment of the invention.

FIG. 2B shows an implementation in which the actual usage rate may be restricted by other factors as well. For example, a transmitter as in Example 2 may not have enough power to transmit at the rate indicated by the procedure of FIG. 2. Alternatively, the amount of data available for transmission by such a transmitter may not justify using the resource at the permitted usage rate. In such cases, the usage rate may be chosen in block 265 as min {$Y_j$, $Y_{poss}$}, where $Y_{poss}$ represents the highest usage rate possible or otherwise desirable given the user's current characteristics.

Described above are applications in which the length of a persistence vector is equal to either m (i.e. the number of members in the set of available rates) or m−1. Note that cases may also exist in which it is desirable to skip one or more of the available rates (e.g. because the rate is not available or is inapplicable to a particular user). In such cases, a persistence vector need not contain an element corresponding to such a rate or rates, and therefore, its length may have any nonzero value less than or equal to m. Also note that the procedures of FIGS. 2, 2A, and 2B may be modified as necessary to map each element of such a persistence vector to the corresponding element of rate vector Y. By the same token, the process of selecting a particular persistence vector from among a set of persistence vectors may include such a mapping task in cases where, for example, the set of persistence vectors has fewer members than the set of available rates.

In many applications, the set of available rates may be arranged so that a<b implies $Y_a<Y_b$ (as in Examples 1 and 2 above). Likewise, the values of a persistence vector such as V described above may be chosen such that c<d implies that $[V_c]>[V_d]$ ($[V_c]\geq[V_d]$), where $[V_i]$ indicates the probability represented by the value of $V_i$. In such a case, the probability that a rate will be chosen increases (does not decrease) as the rates become smaller. However, note that no such relation among the rates or the persistence values is required to employ a system or method according to an embodiment of the invention. For example, a particular rate may be disfavored because it is harder to implement than another rate, or because it is less incompatible with a part of the system than another rate, or for some similar reason. In such a case, a persistence vector may be fashioned so that this rate is less likely to be chosen than one or more higher rates (e.g. c<d does not imply $[V_c]>[V_d]$ or $[V_c]\geq[V_d]$). Similarly, a persistence vector may be fashioned to favor one or more higher rates over lower rates.

Figure 3:
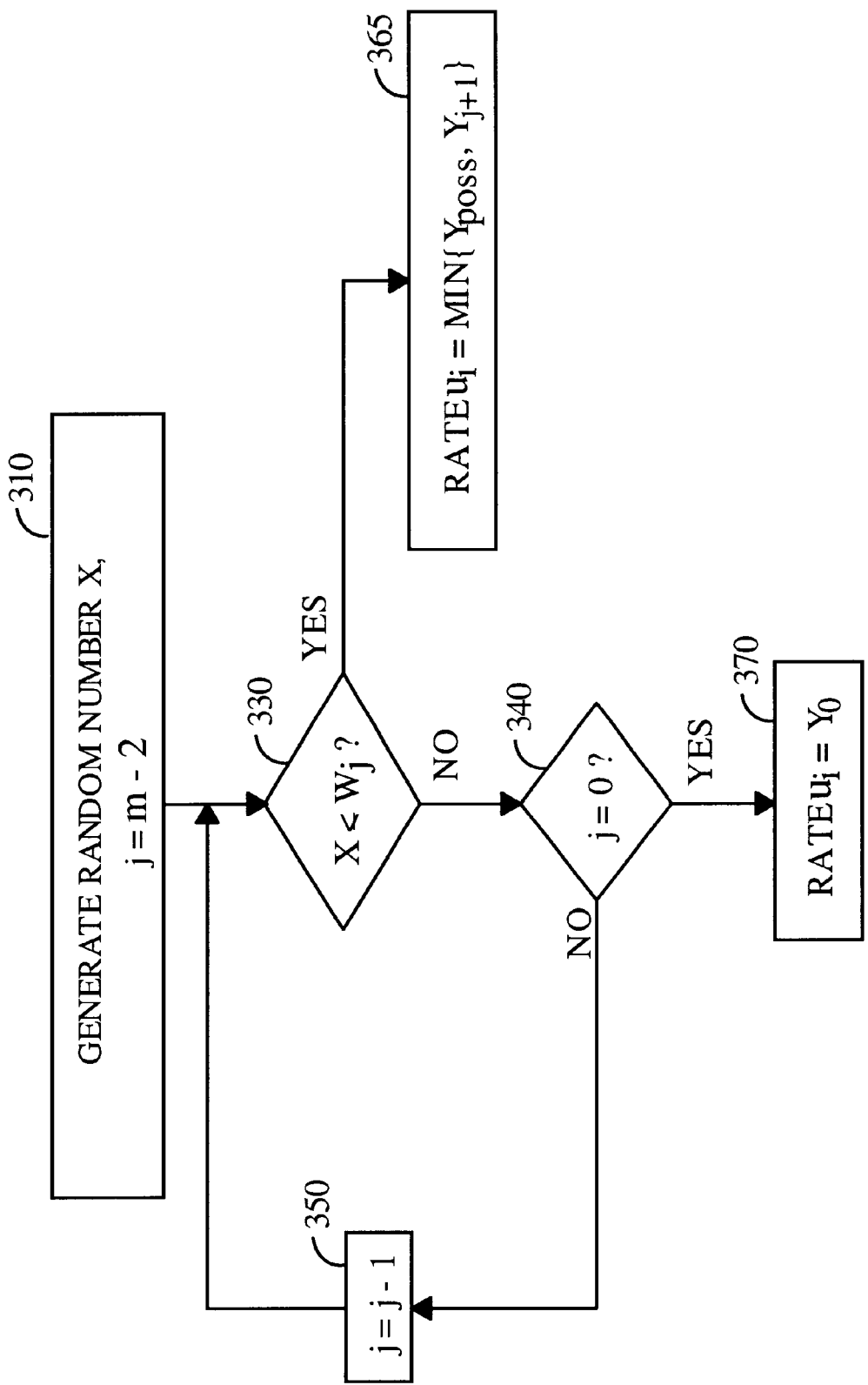
FIG. 3 shows a flowchart of a method according to a third embodiment of the invention.

Note that although the random number x as generated in block 220 is described as being drawn from a set having a uniform distribution, any other distribution may also be used in a system or method according to an embodiment of the invention. As the selection of a random or pseudorandom value may be computationally intensive, it may be desirable in certain applications to reduce the number of such values to be selected. FIG. 3 shows a method according to a third embodiment of the invention, in which only one random number x is generated (in initialization block 310). In this case, (m−1)-element persistence vector W represents a cumulative density function (CDF), each element $W_j$ representing a probability that some rate $Y_h$ will be assigned, where h is any integer such that $0 \leq h \leq j$, $Y_h$ is a valid assignment for this user, and $0 \leq j \leq m-2$. In the loop of blocks 330, 340, and 350, the maximum value of j is identified for which $x > W_j$. If the test in block 330 succeeds, rate $Y_{j+1}$ may be chosen, or the usage rate may be chosen as $\min\{Y_{j+1}, Y_{poss}\}$ as in block 365, where $Y_{poss}$ represents the highest usage rate possible given the user's current characteristics. If the value of j reaches zero in block 340, then the rate $Y_0$ is chosen; otherwise, the value of j is decremented in block 350. Note that this method also may be modified to incorporate a wait-and-repeat scheme as in FIG. 2A. This method may be altered to allow the use of one among many other relations between the values of x and $W_j$ in place of the test condition shown in block 330, depending on the particular characteristics of the values chosen for x and $W_j$.

Even in a case where a persistence vector is not originally presented as a CDF, it is possible for the user to generate a CDF from such a vector, and thereby reduce the number of random number generations for each rate assignment procedure to only one. First, a probability density function (PDF) vector F may be constructed from a persistence vector V as:

$$F_{n-1} = [V_{n-1}];$$

$$F_i = [V_i] \prod_{j=n-1}^{i+1} (1 - [V_j]), \, i \in \{1, 2, 3, \ldots, n-2\};$$

$$F_0 = \prod_{j=n-1}^{1} (1 - [V_j])$$

Next, the PDF vector F is converted to a CDF vector Z by the following procedure or its equivalent:

$$Z_i = \sum_{j=i}^{n-1} F_j.$$

A persistence vector is then constructed such that its elements represent the elements of Z. For example, a vector W suitable for use in the implementation of FIG. 3 described above may be constructed according to the relation $$W_i = 1 - Z_i,$$

such that an element of W having a value of 1 represents a probability of zero, and an element of W having a value of 0 represents a probability of 1. Many other relations may be chosen to exist between the elements of a persistence vector and the probabilities which those elements represent, depending on the design of a particular implementation.

If and when an overload condition arises in a system according to FIG. 1 or FIG. 1A, the users 120 may not be aware that an overload has occurred, especially if the resource is consuming reserve capacity in order to meet user demands. Even in a case where the overload condition causes the resource's availability to a user to drop below a user's expectation or demand, the user may still be unable to verify whether the shortcoming is due to a resource overload or to the failure of another component in the supply path. Moreover, in certain applications such as wireless data communications, it is possible that no feedback mechanism exists whereby a user may obtain timely notification of an overload. Therefore, the user may continue to use the resource, unaware of the problem.

It is desirable in such a situation for the system to include a capability for notifying the users of the overload condition so that they may modify their uses (for example, by adopting a different persistence vector). Such feedback capability may also be useful in other, non-overload situations where it is desired to distribute information relating to the resource to one or more users (e.g. to indicate the availability of additional capacity or a reduction in resource capacity).

Figure 4:
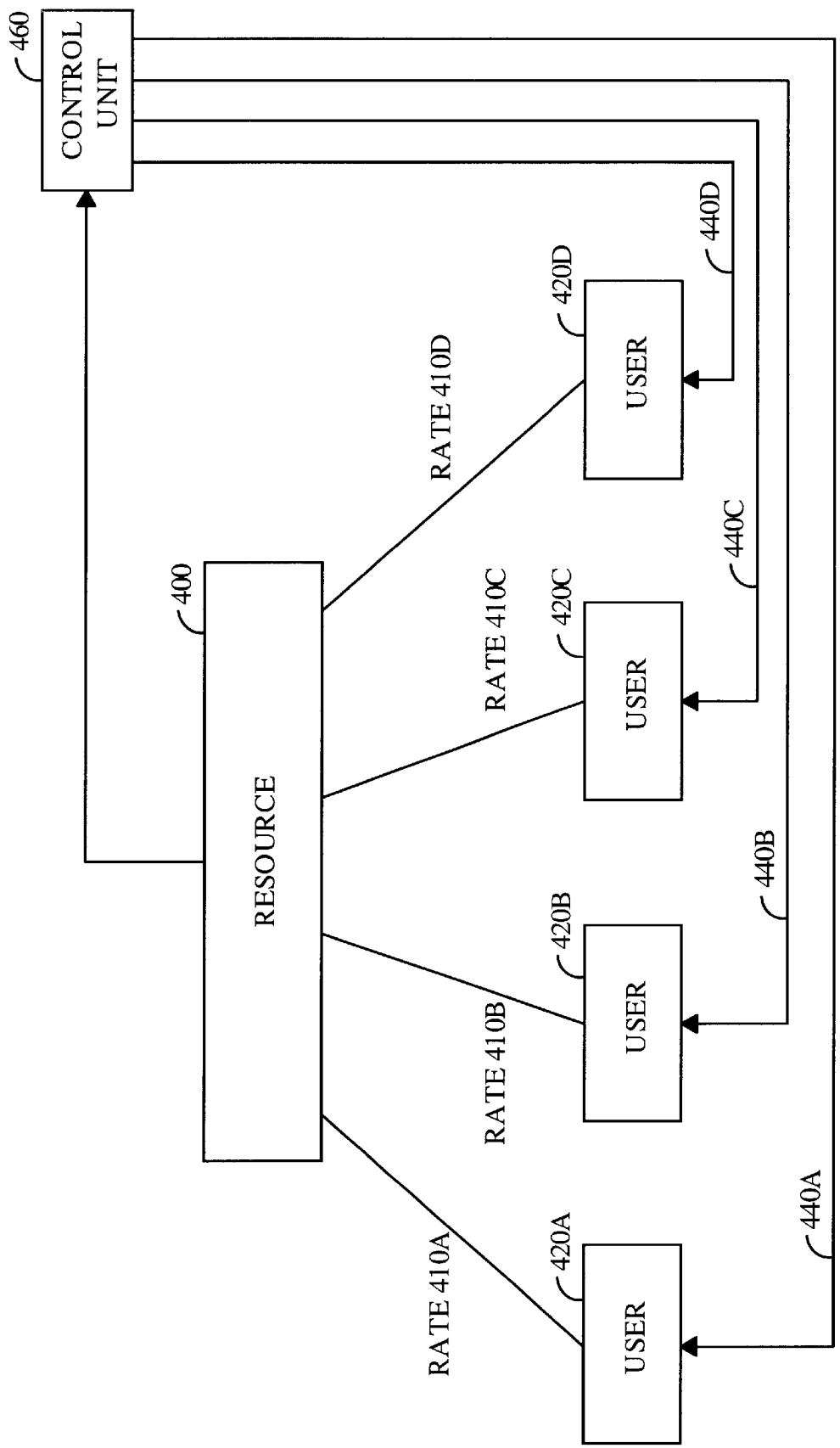
FIG. 4 is an illustration of a system including a resource shared among several users and a control unit coupled to the resource and the users.

FIG. 4 shows an example of such a system with such capability, wherein control unit 460 receives information related to usage of resource 400 by users 420*a–d* (for example, current rate of use by one or more users, history of use by one or more users, reserve capacity available, predicted capacity, status of the resource, information relating to scheduled or unscheduled events that may affect resource capacity or status, etc.). Control unit 460 may issue commands based on this (and possibly other) information to users 420*a–d* over respective communications pathways 440*a–d,* such that these commands influence at least in part the respective permitted usage rates 410*a–d* of the users. Note that it is possible for control unit 460 to be implemented within the resource 400 or, alternatively, as a part of one or more of the users 420*a–d.*

If a user becomes aware of an overload condition, the possibility exists for user-driven remediation. If at least some of the users are able to communicate with each other, then a solution such as a reduction in usage rate may be negotiated between them. In many instances, however, such communication between users may be unavailable, impractical, or undesirable, and it may be desirable for a centralized feedback mechanism such as control unit 460 not only to convey information relating to the resource but also to exert some degree of control over the permitted usage rates (for example, control unit 460 may issue commands that contain or relate to changes in one or more persistence vectors).

If complete knowledge of the future usage requirements of the users were available, then it would be theoretically possible to construct an optimal usage schedule that would satisfy the users' requirements as much as possible while completely avoiding all overload conditions. In many practical systems, however, a user's future needs will be unknown even to the user itself. One way to prevent overload conditions in such systems would be on the basis of current usage requirements: for example, by granting usage rate allocations to users only on a request basis. In order to convey the usage requests from the users back to the control unit, however, such a scheme would require an upstream communication pathway which might not otherwise be necessary. Moreover, additional costs and delays would be incurred in receiving, processing and responding to such requests.

In order to avoid some of the disadvantages of a request/grant scheme, it is possible to issue rate allocations based on users' past usages. Suitable schemes of usage rate selection and assignment and rate allocation include those described in the copending U.S. patent application Ser. No. 09/410,294, entitled "SYSTEM AND METHOD FOR PERSISTENCE-VECTOR-BASED MODIFICATION OF USAGE RATES," and incorporated by reference above, and U.S. Pat. No. 6,324,172, entitled "METHOD OF RATE ALLOCATION IN A DATA COMMUNICATIONS NETWORK," issued Nov. 27, 2001, and assigned to the assignee of the present invention. Such schemes enable the control unit to share control with the users, allowing the users to control the details of their own usage to some extent while the control unit concentrates on system-wide issues such as the prediction and avoidance of overload conditions.

Figure 4A:
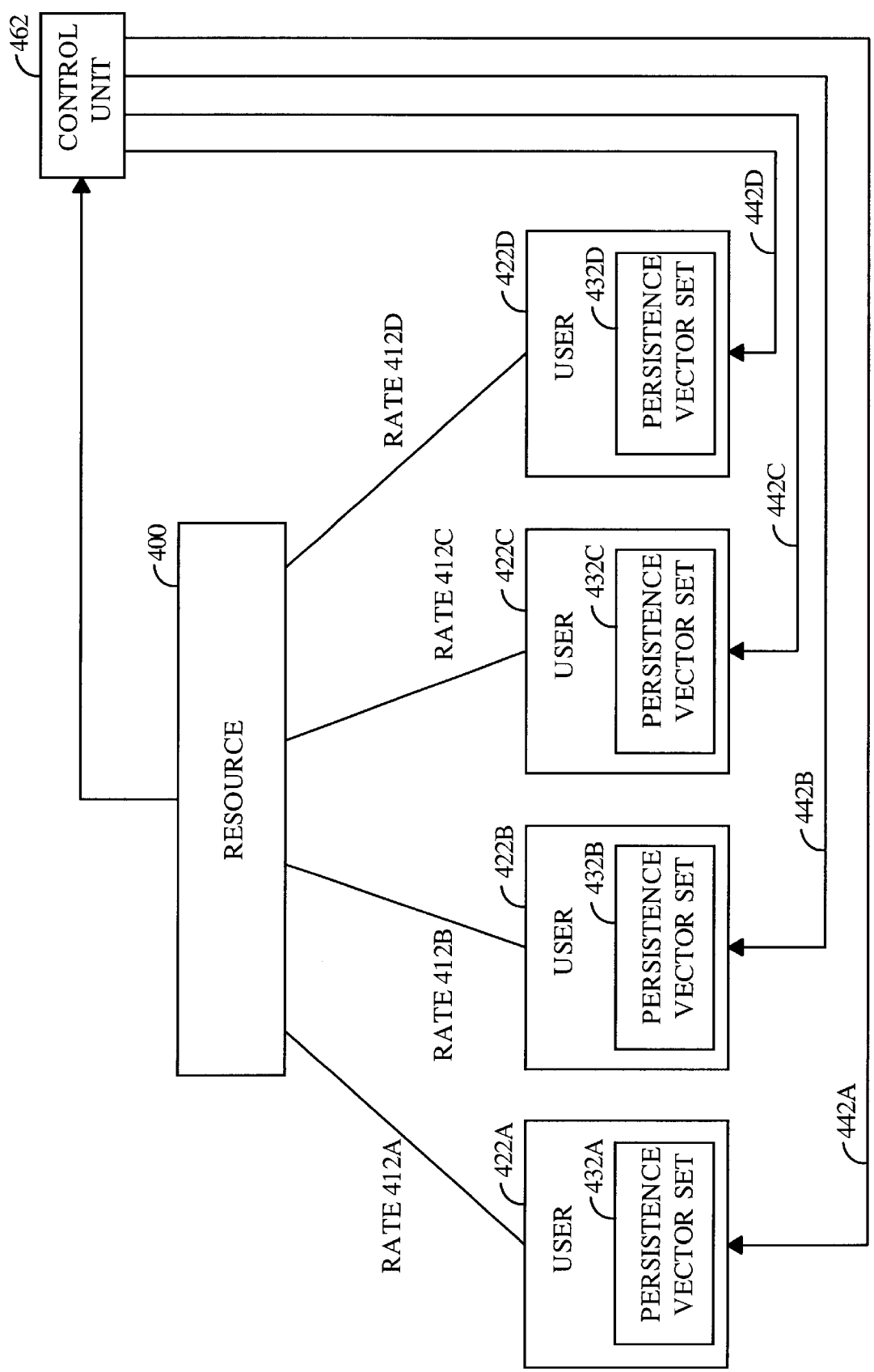
FIG. 4A is an illustration of a system according to a fourth embodiment of the invention.
Figure 4B:
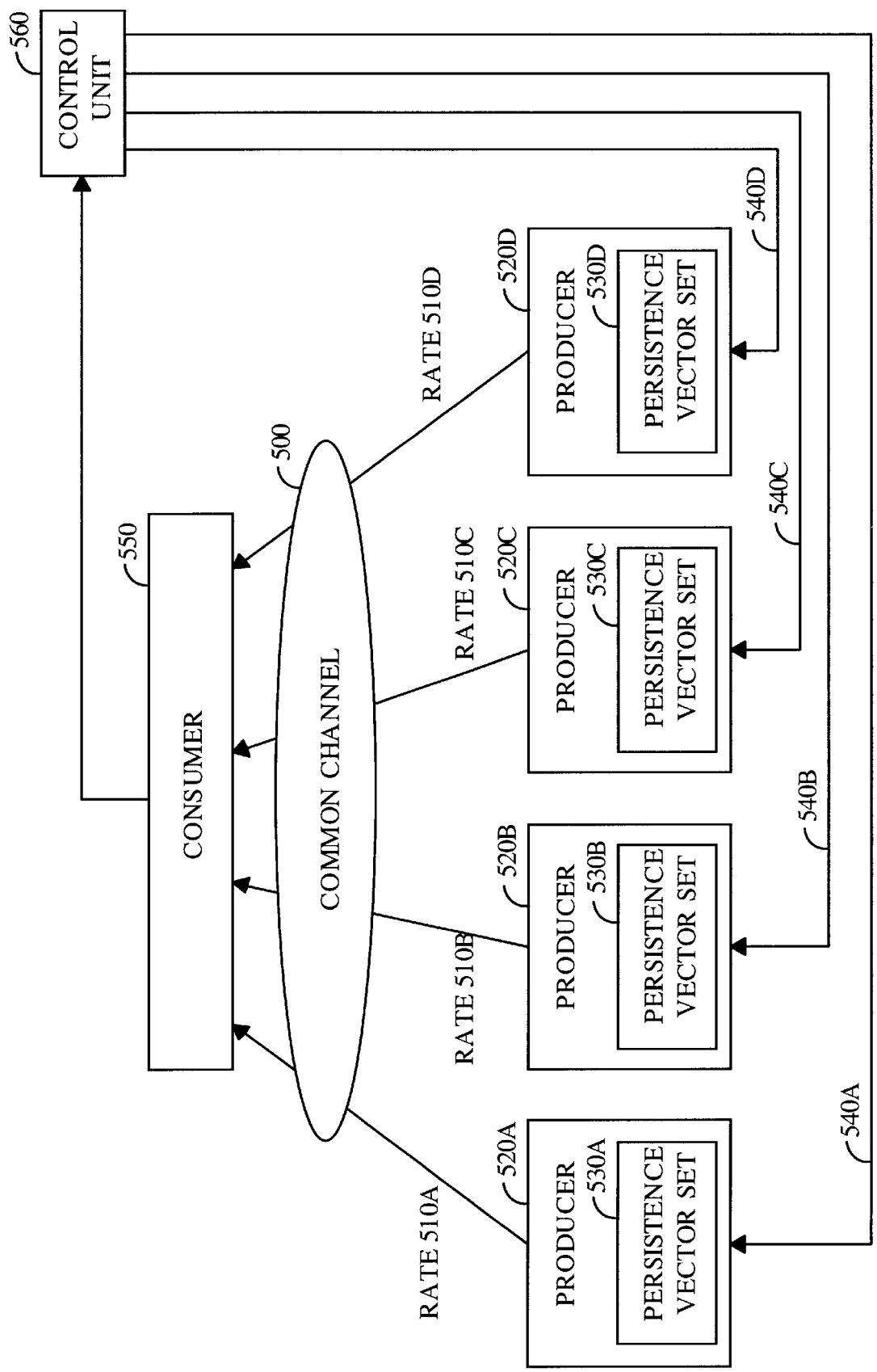
FIG. 4B illustrates a wireless network for data communications as one implementation of the system of FIG. 4A.

FIG. 4A shows a system according to a fourth embodiment of the invention, wherein control unit 462 receives information related to usage of resource 400 by users 422*a–d*, and each user 422*i* has a set of persistence vectors 432*i*. In this example, the permitted usage rate 412*i* of each user 422*i* is influenced at least in part by commands received from control unit 462 over respective communications pathways 442*a–d* (for example, such commands may contain or relate to changes in one or more persistence vectors). Note that it is possible for control unit 462 to be implemented within the resource 400 or, alternatively, as a part of one or more of the users 422*i*. An exemplary application of a system according to FIG. 4A to a communications network such as the one described in Example 2 above is shown in FIG. 4B, wherein users 520*a–d* are data producers, each having a set of persistence vectors 530*a–d*; resource 500 is a common transmission channel linking the producers with data consumer 550; and control unit 560 receives usage information from (and may be incorporated into) the consumer 550. Producers 520*i* use resource 500 by transmitting data to consumer 550 as allowed by permitted usage rates 510*a–d*, respectively, and they receive respective signals 540*a–d* from the control unit. Consumer 550 and control unit 560 may be parts of a base station, and control signals 540 may be carried over a forward link of the communications channel.

Any of the methods described or suggested in FIGS. 2, 2A, or 2B or in the text above may be applied to a system according to the embodiments illustrated in FIGS. 4A and 4B. If the procedure is successful, the user uses the resource at a rate not greater than the selected rate. The rate assignment procedure may be repeated when, for example, a persistence vector is updated, some scheduled or unscheduled event occurs (expiration of a timer, triggering of an alarm event such as a low-power warning, etc.) or a predetermined time delay has elapsed.

At any particular time, a user's use of the resource conforms to a particular permitted usage rate among the users set of available rates. It is not necessary for all users to have the same set of available rates, but the set for each user should be known to control unit 462 (560) so that it may reliably predict the state of resource use and issue control signals appropriately. It is also possible for each users set of available rates to be updated or otherwise modified according to a command issued by control unit 462 (560) whether such a command is issued periodically or according to another scheme.

The set of persistence vectors may be a permanent aspect of the operation of the user, or it may be issued by control unit 462 (560), in which case one or more of its members may be updated periodically or otherwise. Situations in which a new set of persistence vectors may be issued are not limited to overload conditions. For example, a persistence vector set may be issued to a mobile unit at channel assignment and again upon handoff. Other situations that may cause the control unit to send a new or updated persistence vector set to one or more users include the following:

A user first requests usage of the resource.

The control unit wishes to reserve a portion of the resource's capacity.

The control unit wishes to deny resource use to one or more users.

The control unit wishes to maximize the number of users able to use the resource at one time.

The control unit responds to a request from a user (or to requests from a number of users).

The control unit responds to detected or communicated user characteristics (e.g. recent usage rate).

In a wireless data communications network, the number of connections between the producer (mobile station) and the ground network (base stations) changes.

Persistence vector updates may also be used as a means to pass control over usage rates between the control unit and the users. For example, the control unit may prevent users from using the maximum usage rate (or any other rate) by setting the probability for that rate to zero and/or by modifying the persistence vector(s) corresponding to that rate. Alternatively, the control unit may cause one or more users to use only the lowest rate by setting the probabilities for all other rates to zero. Such action might occur in an emergency situation, for example, where it becomes desirable to support as many connections as possible or to reserve a portion of the capacity for priority use without terminating service to other users. On the other hand, the control unit may effectively transfer control over resource usage to the users by setting the probability for the maximum rate to one, thereby permitting each user to select its own permitted usage rate.

In a method according to a fifth embodiment of the invention, the occurrence of persistence vector assignments and updates is reduced by using correction vector sets. In a basic implementation, one set of persistence vectors is shared by all users, and a set of correction vectors is transmitted to a user or users for whom a different set of persistence vectors is desired. Each element of each correction vector corresponds to and modifies an element of a corresponding persistence vector, and the user applies a correction vector to the appropriate persistence vector by, for example, adding or multiplying the two vectors. The user then uses the resulting modified persistence vector or vectors to establish its permitted usage rate according to one of the methods described or suggested herein.

Implementation of correction vectors reduces control traffic while allowing a system to appropriately accommodate users having different usage behaviors or profiles (e.g. premium vs. economy, commercial vs. individual, scheduled or automatic use vs. use on demand, etc.). In a variation of the basic implementation described above, the set of correction vectors has fewer members than the set of persistence vectors, each such member corresponding to and modifying one among a predetermined subset of the set of persistence vectors. For example, correction vectors may be supplied only for those persistence vectors most likely to be referenced by the user. Alternatively or in addition to this variation, one or more among the set of correction vectors may have fewer elements than the corresponding persistence vector. Such variations, which reduce the volume of control traffic even further, may be used to concentrate control information by restricting the corrections to those persistence vectors (or elements thereof) which are likely to have the greatest effect on resource usage.

The foregoing description of the preferred embodiments is provided to enable any person skilled in the art to make or use the present invention. Various modifications to these embodiments are possible, and the generic principles presented herein may be applied to other embodiments. For example, the invention may be implemented in part or in whole as hard-wired circuits, as circuit configurations fabricated into application-specific integrated circuits, or as firmware programs loaded into non-volatile storage or software programs loaded from or into data storage media as machine-readable code, such code being instructions executable by arrays of logic elements such as microprocessors or other digital signal processing units. Thus, the present invention is not intended to be limited to the embodiments shown above but rather is to be accorded the widest scope consistent with the principles and novel features disclosed in any fashion herein.

What is claimed is:

1. A system comprising:
a resource having a capacity measure, and
a plurality of users, each having a usage rate, a set of persistence vectors, and a set of available rates,
wherein a use of the resource by each among the plurality of users is determined at least in part by the usage rate of the user, and
wherein the usage rate of each among the plurality of users is selected from at least the user's set of available rates, said selection being determined at least in part by one among the set of persistence vectors.

2. The system according to claim 1, wherein each element of each vector among the set of persistence vectors corresponds to one among the set of available rates.

3. The system according to claim 2, wherein each element of the persistence vector of at least one among the plurality of users represents a probability of using a rate at least as high as the corresponding one among the set of available rates.

4. The system according to claim 2, wherein each vector among the set of persistence vectors corresponds to one among the set of available rates.

5. The system according to claim 1, said selection being determined at least in part by a previous usage rate of the user.

6. The system according to claim 2, wherein each element of each vector among the set of persistence vectors corresponds to one among the set of available rates.

7. The system according to claim 6, wherein the value of at least one member of a user's set of available rates is substantially equal to $19{,}200 \times 2^i$ bits/second, wherein $i$ is an integer.

8. The system according to claim 6, wherein in the set of available rates of at least one among the plurality of users, the value of at least one member of the set is substantially equal to double the value of another member of the set.

9. The system according to claim 6, wherein the usage rate of at least one among the plurality of users is a null usage rate.

10. The system according to claim 6, wherein an actual use of the resource by at least one among the plurality of users is not greater than the user's usage rate.

11. The system according to claim 6, wherein at least one among the set of persistence vectors represents a cumulative density function vector.

12. The system according to claim 11, wherein said cumulative density function vector is based at least in part from one among the set of persistence vectors.

13. The system according to claim 6, wherein each vector among the set of persistence vectors corresponds to one among the set of available rates.

14. The system according to claim 13, wherein each among the plurality of users has the same set of available rates.

15. The system according to claim 6, wherein each among the plurality of users has a random number, and
wherein said selection is based at least in part on a relation between the random number and at least one of the elements of a vector in the user's set of persistence vectors.

16. The system according to claim 15, wherein the random number of each among the plurality of users is drawn from a set having a uniform distribution.

17. The system according to claim 15, wherein said selection is based at least in part on a relation between the random number and at least one of the elements of a selected vector in the user's set of persistence vectors, and
wherein said selected vector corresponds to the previous usage rate of the user.

18. The system according to claim 15, wherein each among the plurality of users comprises a data producer, and each among the usage rates comprises a rate of data production.

19. The system according to claim 18, wherein the resource is a wireless channel for data communications; and
wherein use of the resource comprises transmitting data over the wireless channel.

20. The system according to claim 18, wherein the resource is the reverse link of a wireless CDMA channel for data communications.

21. The system according to claim 15, wherein at least one among the set of persistence vectors represents a cumulative density function vector.

22. The system according to claim 21, wherein said cumulative density function vector is based at least in part from one among the set of persistence vectors.

23. The system according to claim 15, further comprising a control unit,
wherein the control unit receives information relating to the resource, and
wherein the control unit supplies at least a portion of the set of persistence vectors of at least one among the plurality of users.

24. The system according to claim 15, further comprising a control unit,
wherein the control unit receives information relating to the resource, and wherein the control unit modifies at least a portion of the set of persistence vectors of at least one among the plurality of users at least indirectly.

25. The system according to claim 23, wherein at least one among the set of persistence vectors represents a cumulative density function vector.

26. The system according to claim 25, wherein said cumulative density function vector is based at least in part from one among the set of persistence vectors.

27. The system according to claim 23, wherein at least one vector is a member of the set of persistence vectors of each among the plurality of users.

28. The system according to claim 23, wherein at least one among the set of persistence vectors of at least one among the plurality of users is based at least in part on (1) another among the user's set of persistence vectors and (2) a correction vector.

29. The system according to claim 23, wherein at least a portion of one among the set of persistence vectors of at least one among the plurality of users is based on a product of (1) at least a portion of another among the user's set of persistence vectors and (2) a correction vector.

30. The system according to claim 29, wherein the control unit issues the correction vector to at least one among the plurality of users.

31. A method comprising:

using a shared resource at a rate determined at least in part by a first usage rate;

obtaining a random number; and using the shared resource at a rate determined at least in part by a second usage rate, said second usage rate being determined at least in part by comparing the random number to at least one element of a persistence vector.

32. A data storage medium, said medium bearing machine-readable code, such code being instructions executable by an array of logic elements, said instructions defining a method comprising:

using a shared resource at a rate determined at least in part by a first usage rate;

obtaining a random number; and using the shared resource at a rate determined at least in part by a second usage rate, said second usage rate being determined at least in part by comparing the random number to at least one element of a persistence vector.

* * * * *